Figure 1:
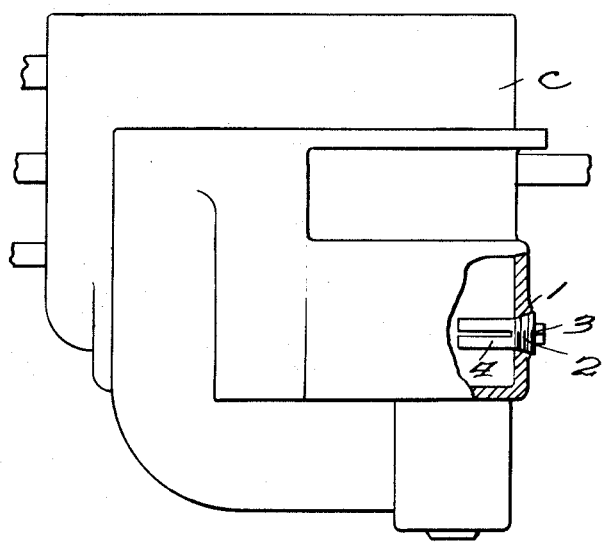

S. J. ROSNICK & W. CAIGAN.
ATTACHMENT FOR POWER TRANSMISSION CASES.
APPLICATION FILED MAY 13, 1918.

1,281,842.  Patented Oct. 15, 1918.

Samuel J. Rosnick
William Caigan
Inventor

By Geo. P. Kimmel
Attorney

UNITED STATES PATENT OFFICE.

SAMUEL J. ROSNICK AND WILLIAM CAIGAN, OF LAMBERTON, PENNSYLVANIA.

ATTACHMENT FOR POWER-TRANSMISSION CASES.

1,281,842.        Specification of Letters Patent.     Patented Oct. 15, 1918.

Application filed May 13, 1918. Serial No. 234,217.

*To all whom it may concern:*

Be it known that we, SAMUEL J. ROSNICK and WILLIAM CAIGAN, a citizen of the United States, and a subject of the King of England, respectively, residing at Lamberton, in the county of Fayette and State of Pennsylvania, have invented certain new and useful Improvements in Attachments for Power-Transmission Cases, of which the following is a specification.

This invention relates to attachments for the casings of variable speed power transmission gearing and it is the principal object of the invention to provide an attachment for removing the metal particles falling from the gears therein during the shifting and rotation of the same from the lubricant contained therein and as a consequence, maintaining said lubricant clear and free from such particles, thereby obviating damage to the bearing surfaces over which it is applied by reason of the resultant abrasive action.

It is a more specific object of the invention to provide a magnetic closure plug for the lubricant filling opening in the case of a variable speed power transmission which can be arranged therein without alteration to said case.

The improvements in the details and arrangement of parts will be apparent from an inspection of the accompanying drawings, in connection with the specific description hereinafter contained, and wherein the preferred embodiment of the invention is disclosed for the purpose of imparting a full understanding of the same.

Figure 2:
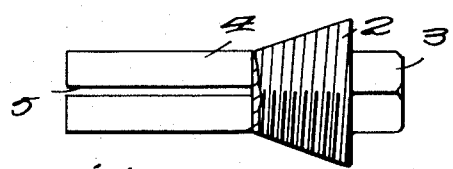
Figure 3:
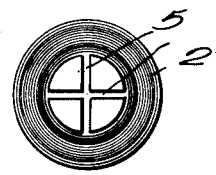

In the drawing:

Figure 1 is a side elevation of a power transmission casing having a portion thereof broken away and shown in section with our improved magnetic plug arranged in the lubricant filling opening therein, Fig. 2 is a side elevation of the improved plug having a part shown in section, and Fig. 3 is an end elevation thereof.

Having more particular reference to the drawing, in connection with which like reference characters will designate corresponding parts throughout the several views, *c* represents the casing of the power transmission mechanism, which casing has a tapered screw threaded opening 1 formed in the lower portion thereof to permit the introduction of lubricant thereinto.

Our improved magnetic plug comprises a substantially frusto-conical screw threaded body portion 2 carrying a nut 3 upon its outer end while an extension 4 is formed upon its inner end and is divided by diametrically disposed slots 5 into a plurality of spaced pieces, which pieces are magnetized in a suitable manner and as will be understood serve to attract all metal particles dropping from the gears in the casing *c* during the shifting and rotation of the same into engagement therewith. In this way, it will be understood that the lubricant contained by the casing will be maintained clear and free from such particles and as a consequence, the liability of the damaging of the bearing surfaces of the various parts of the engine due to the application of the lubricant thereto during operation will be reduced to minimum. The plug can of course be removed from the casing when desired and the magnetic pieces formed by the extension 4 cleaned or freed of such metal particles as may be adhering thereto, whereupon the same can be replaced.

Manifestly, the construction shown is capable of considerable modification and such modification as is within the scope of our claims, we consider within the spirit of our invention.

We claim:

1. A magnetic plug for the lubricant filling opening of the case of a power transmission mechanism.

2. A magnetic plug for the lubricant filling opening of the case of a power transmission mechanism having an extension formed on its inner end and adapted to be arranged in said case.

3. A magnetic plug for the lubricant filling opening of the case of a power transmission mechanism having an extension formed on its inner end divided to form a plurality of spaced fingers.

In testimony whereof, we affix our signatures hereto.

SAMUEL J. ROSNICK.
WILLIAM CAIGAN.